US012631864B2

(12) United States Patent
Clot et al.

(10) Patent No.: US 12,631,864 B2
(45) Date of Patent: May 19, 2026

(54) OPTICAL FOCUSING AND COLLECTION SYSTEM

(71) Applicants:COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

(72) Inventors: Eric Clot, Grenoble (FR); Isabelle Joumard, Grenoble (FR); Vladimir Naletov, Kazan (RU); Olivier Klein, Grenoble (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 489 days.

(21) Appl. No.: 18/022,578

(22) PCT Filed: Aug. 26, 2021

(86) PCT No.: PCT/EP2021/073653
§ 371 (c)(1),
(2) Date: Feb. 22, 2023

(87) PCT Pub. No.: WO2022/043460
PCT Pub. Date: Mar. 3, 2022

(65) Prior Publication Data
US 2024/0036300 A1 Feb. 1, 2024

(30) Foreign Application Priority Data

Aug. 28, 2020 (FR) ...................................... 2008794

(51) Int. Cl.
| *G02B 21/04* | (2006.01) |
| *G02B 17/06* | (2006.01) |
| *G02B 21/16* | (2006.01) |

(52) U.S. Cl.
CPC ............. *G02B 21/04* (2013.01); *G02B 17/06* (2013.01); *G02B 21/16* (2013.01)

(58) Field of Classification Search
CPC ........ G02B 21/04; G02B 17/06; G02B 21/16; G02B 5/001; G02B 17/0652; G02B 21/084; G02B 17/0631; G01J 3/0208; G01J 3/44
See application file for complete search history.

(56) References Cited

U.S. PATENT DOCUMENTS

| 2005/0237511 A1* | 10/2005 | Takahashi | ............ G02B 26/101 356/121 |
| 2010/0309566 A1* | 12/2010 | DeWitt | ................ G02B 17/084 359/729 |
| 2015/0204772 A1* | 7/2015 | Sharpe | ................... G01N 21/49 356/436 |

FOREIGN PATENT DOCUMENTS

| FR | 2433767 A1 | 3/1980 |
| JP | 2010139465 A | 6/2010 |

(Continued)

OTHER PUBLICATIONS

International Search Report for PCT/EP2021/073653 dated Oct. 18, 2021.
Written Opinion for PCT/EP2021/073653 dated Oct. 18, 2021.

*Primary Examiner* — Sharrief I Broome
*Assistant Examiner* — K Muhammad
(74) *Attorney, Agent, or Firm* — McDonald Hopkins LLC

(57) ABSTRACT

An optical focusing and collecting system includes: a first optical shaping portion, including an output surface, adapted to supply a primary light beam which is made annular; a (Continued)

second optical focusing and collecting portion, including a conical upper central reflective surface and a conical lower central reflective surface; a third optical return portion, including a reflective surface located between the output surface and the upper central reflective surface, along a main optical axis ($\Delta$) and having transverse dimensions smaller than those of the annular primary light beam supplied by the first optical portion.

10 Claims, 4 Drawing Sheets

(56) References Cited

FOREIGN PATENT DOCUMENTS

WO      2010141092  A2    12/2010
WO      2012165549  A1    12/2012

* cited by examiner

OPTICAL FOCUSING AND COLLECTION SYSTEM

CROSS-REFERENCE TO RELATED APPLICATIONS

This is a National Stage application of PCT international application PCT/EP2021/073653, filed on Aug. 26, 2021, which claims the priority of French Patent Application No. FR2008794, filed Aug. 28, 2020 both of which are incorporated herein by reference in their entireties.

TECHNICAL FIELD

The field of the invention is that of optical focusing and collecting systems, which can in particular be used in the context of confocal microscopy and spectroscopy, for example of the fluorescence or Raman type.

PRIOR ART

In the fields of confocal microscopy and spectroscopy, the optical system may include: an optical emitter adapted to emit a primary or excitation light beam; an optical system adapted on the one hand to focus the primary light beam on a sample to be analysed, and on the other hand to collect a secondary light beam originating from the sample in response to excitation thereof by the primary light beam; and a photodetection system intended to receive and detect the secondary light beam. The optical system is then located between the optical emitter and the photodetector on the one hand, and the sample to be analysed on the other hand. Ideally, the entire optical system should be able to operate at the diffraction limit, where the size of the primary and secondary light spots is reduced together with their wavelength at the sample.

Some confocal microscope or spectrometer objectives ensure these optical focusing and collection functions. They could belong to the class of dioptric optical systems, i.e. optical systems formed only by dioptric (i.e. refractive) optical elements; or belong to the class of catadioptric optical systems, i.e. optical systems formed by a combination of dioptric optical elements and reflective optical elements.

In order to approach achromaticity, they may include a plurality of lenses selected and arranged so as to correct, as much as possible, chromatic and spherical aberrations. However, this plurality of lenses leads to a large bulk for a given numerical aperture, even though it is generally desired to have a compact optical system with an appropriate working distance (distance between the output of the optical system and the focal plane) to maximise the collection and detection of light beams of interest. In addition, each of these lenses absorbs or slightly reflects the light that pass therethrough and reduces the transmission efficiency accordingly.

Moreover, there are also optical systems of the catoptric type, i.e. formed only by reflective optical elements, which are intrinsically achromic. However, depending on the selected solution, they may have a more or less significant area of darkness located along the optical axis of the optical system, thereby degrading the performances of the optical system, such as the rate of collection of the secondary light beam (ratio between the number of collected photons of the secondary light beam to the number of emitted photons of the secondary light beam). This degradation in performances and detection isotropy could make the system unsuitable for some uses due to this loss of information at the centre of the field of vision.

The document WO2010/141092A2 describes a catoptric and axiconic optical system, adapted to focus a light beam. This optical system is formed by several coaxial conical reflective surfaces. However, while it could be used to focus a primary light beam and collect a secondary light beam, this optical system, designed for non-confocal optical microscopy, does not allow differentiating the optical paths of these light beams. It is then necessary to use a semi-reflective dichroic filter and possibly a spectral filter to transmit to the photodetection system only the photons of the secondary light beam. Nevertheless, the use of these filters results in a degradation of the detection performances of the optical system.

DISCLOSURE OF THE INVENTION

An objective of the invention is to remedy at least in part the drawbacks of the prior art, and more particularly to propose an optical focusing and collecting system based on catoptric and axiconic optics, with improved performances, in particular having a small relative size, a large associated numerical aperture, as well as a working distance that can be adapted according to the intended applications, without it being necessary to use a semi-reflective dichroic filter to separate the optical paths of the primary and secondary light beams.

For this purpose, the object of the invention is an optical focusing and collecting system, intended to focus on a sample to be analysed a primary light beam emitted by an optical emitter, and to collect a secondary light beam emitted by the sample in response to the primary light beam and to transmit it towards a photodetection system, this optical system including several optical portions each centred along the same main optical axis.

Thus, it includes a first optical shaping portion, adapted to receive the primary light beam on an input surface, and to supply the primary light beam made annular around the main optical axis by an output surface.

It also includes a second optical focusing and collecting portion, including:

a upper central reflective surface conical, formed by a central area surrounded by a peripheral area, and adapted to reflect by the peripheral area the annular primary light beam originating from the output surface of the first optical portion, and to reflect by the central area the incident secondary light beam originating from a lower central reflective surface;

the lower central reflective surface, conical, adapted to reflect and focus on the sample the incident primary light beam originating from the upper central reflective surface; and to collect and reflect the secondary light beam emitted by the sample;

at least two truncated conical and peripheral reflective surfaces, optically coupling the upper and lower central reflective surfaces.

Finally, it includes a third optical return portion, including a reflective surface:

located between the output surface of the first optical portion and the upper central reflective surface of the second optical portion, along the main optical axis and having smaller transverse dimensions to those of the annular primary light beam supplied by the output surface, and adapted to reflect in the direction of the photodetection system the secondary light beam originating from the central area of the upper central reflective surface.

Some preferred yet non-limiting aspects of this optical system are as follows.

The first, second and third optical portions may be superimposed axially on one another, i.e. along the main optical axis.

The first optical portion may be catoptric, the input and output surfaces being reflective.

The second optical portion may be conical and catoptric, the upper and lower central reflective surfaces being superimposed on one another and coaxial along the main optical axis.

The second optical portion may include:

an upper peripheral reflective surface, in the form of a hollow truncated cone radially surrounding the upper central reflective surface, adapted to reflect the primary light beam originating from the upper central reflective surface, and to reflect the secondary light beam originating from a lower peripheral reflective surface;

the lower peripheral reflective surface, in the form of a hollow truncated cone radially surrounding the lower central reflective surface, adapted to reflect the primary light beam originating from the upper peripheral reflective surface, and to reflect the secondary light beam originating from the lower central reflective surface.

The primary light beam can be focused by the lower central reflective surface according to a central angle of inclination with respect to the main optical axis at least equal to 25°.

The second optical portion may have a numerical aperture larger than or equal to 0.5.

The second optical portion may have a working distance along the main optical axis, defined as being the distance between the apex of the cone formed by the lower central reflective surface and the focal point, which depends on the one hand on the maximum inner diameter of the second optical focusing/collecting portion and on the other hand on the profile of the upper and lower peripheral reflective surfaces and of the upper and lower central reflective surfaces. The maximum inner diameter of the second optical portion is herein defined as the maximum distance, along an axis orthogonal to the main optical axis, connecting two opposite points of a radial end of the truncated conical and peripheral reflective surfaces.

The invention also relates to an analysis system including an optical system according to any one of the preceding features, an optical emitter adapted to emit the primary light beam, and a photodetection system adapted to detect the secondary light beam.

The optical emitter can emit a collimated primary light beam and is incident on the input surface along the main optical axis.

BRIEF DESCRIPTION OF THE DRAWINGS

Other aspects, aims, advantages and features of the invention will appear better upon reading the following detailed description of preferred embodiments thereof, given as a non-limiting example, and made with reference to the appended drawings, wherein.

DETAILED DISCLOSURE OF PARTICULAR EMBODIMENTS

In the figures and in the remainder of the description, the same references represent identical or similar elements. In addition, the various elements are not represented to scale so as to promote clarity of the figures. Moreover, the different embodiments and variants are not mutually exclusive and could be combined together. Unless indicated otherwise, the terms "substantially", "about", "in the range of" mean within a 10% margin, and preferably within a 5% margin. Moreover, the terms "comprised between . . . and . . . " and equivalents mean that the bounds are included, unless stated otherwise.

Figure 1:
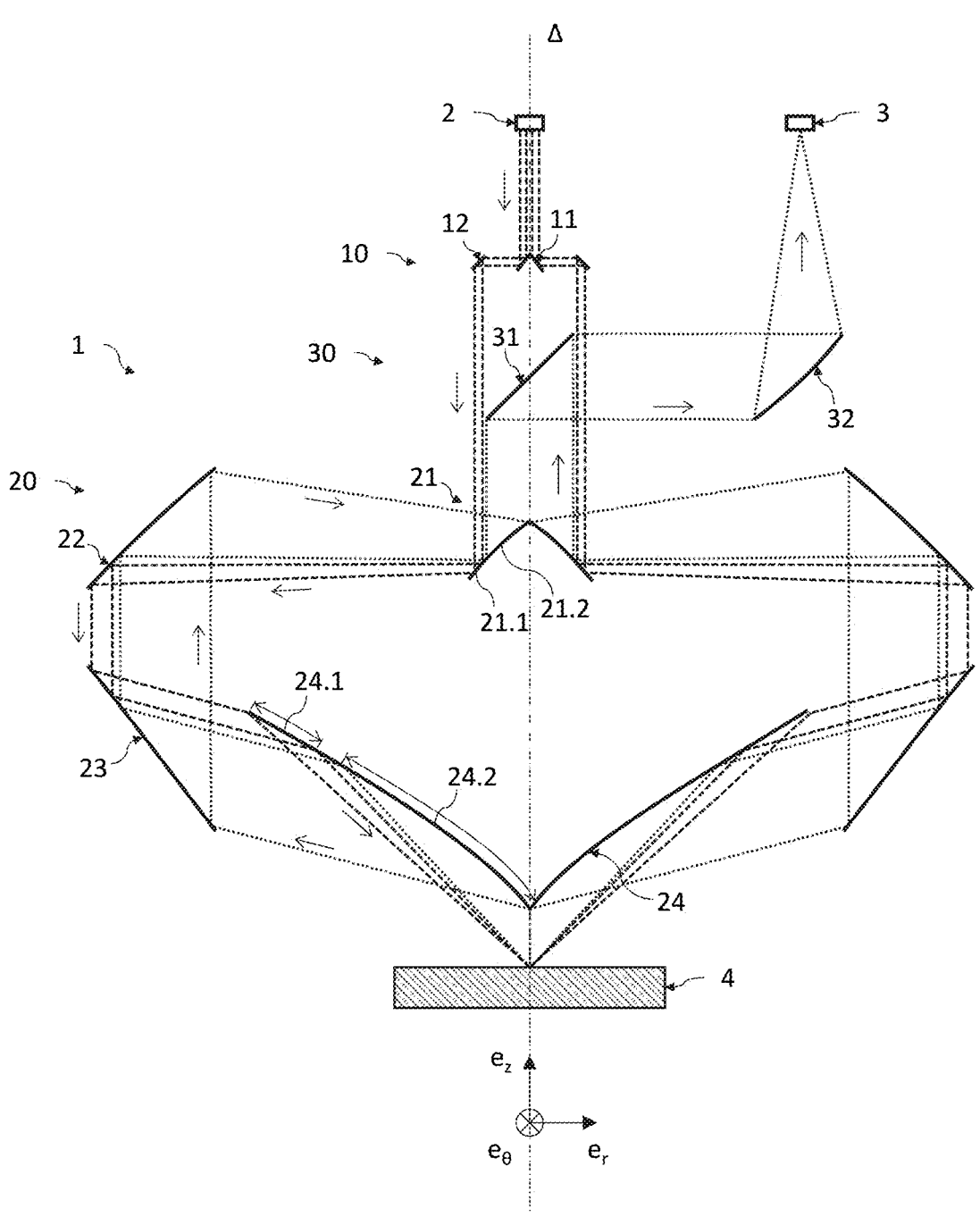
FIG. 1 is a schematic sectional view of an optical system, coupled to an optical emitter and to a photodetection system, according to one embodiment.

FIG. 1 is a schematic and partial view, in cross-section along the main optical axis $\Delta$ of the optical focusing and collecting system 1 according to one embodiment.

Herein and for the remainder of the description, an orthogonal three-dimensional direct reference frame ($e_r$, $e_\theta$, $e_z$) in cylindrical coordinates is defined, where the vector $e_z$ is centred on the main optical axis $\Delta$ of the optical system 1 and directed from a sample 4 to be analysed towards the optical system 1, where the vector $e_r$ is orthogonal to the axis $e_z$, and where the vector $e_\theta$ is orthogonal to the plane ($e_r$, $e_z$). In the remainder of the description, the terms "lower" and "upper" should be understood as being relative to an increasing positioning when moving away from the sample 4 along the vector $+e_z$.

The optical system 1 is adapted to focus on a sample to be analysed 4 a primary light beam emitted by an optical emitter 2, and to collect a secondary light beam emitted by the sample 4 in response to excitation thereof by the primary light beam, and to transmit it in the direction of a photodetection system 3. The portion of the response light beam received by the photodetection system 3 is called the measurement light beam. Hence, the optical system 1 is disposed between the optical emitter 2 and the photodetection system 3 on the one hand, and the sample 4 on the other hand. It may find application in particular in the fields of confocal microscopy and spectroscopy, for example of the Raman or fluorescence type.

In general, the optical system 1 includes several optical portions, superimposed on each other and centred along the main optical axis Δ of the optical system 1, among which:

a first optical shaping portion 10, adapted to make the primary light beam emitted by the optical emitter 2 annular around the main optical axis Δ;

a second optical focusing and collecting portion 20, adapted to focus on the sample 4 the annular primary light beam received from the first optical portion 10, and to collect the light beam emitted by the sample 4 in response to excitation thereof by the annular primary light beam;

a third optical return portion 30, adapted to return the secondary light beam received from the second optical portion 20 in the direction of the photodetection system 3.

This third optical portion 30 includes a reflective surface 31 located between the first and second optical portions 10, 20 along the main optical axis Δ, and inside a space delimited radially by the primary annular light beam supplied by the first optical portion 10.

The optical emitter 2 is adapted to emit the primary light beam in the direction of the optical return portion 10 of the optical system 1. The optical emitter 2 includes an optical source emitting the primary light beam. This optical source may be a laser diode or a light-emitting diode, inter alia.

The primary light beam may be monochromatic or polychromatic. The central wavelength and the spectral range of the primary light beam depend on the intended application of the optical system 1. For illustration, they may be located in the visible, ultraviolet or infrared range. Preferably, the primary light beam is monochromatic, so as to limit the chromatic aberrations associated with some possibly dioptric elements of the optical system.

Preferably, the primary light beam is solid and collimated. In other words, it has an angular intensity distribution which is continuous (for example of the Gaussian type) and is thus distinguished from annular light beams (therefore hollow). In addition, being preferably collimated, the light rays that compose it are parallel to each other. The optical emitter 2 may include a collimator (not represented) located at the output of the optical source when the optical source emits a divergent light beam, like for example in the case of a light-emitting diode.

The photodetection system 3 is adapted to receive and detect the measurement light beam, i.e. a portion of the secondary light beam collected by the optical system. It can supply an electrical signal to a processing unit, whose intensity is representative of the optical power of the detected secondary light beam. It may consist of an avalanche photodiode, a CCD sensor, or any other equivalent photodetector.

As mentioned before, the optical system 1 includes at least three optical portions 10, 20, 30, each centred along the main optical axis Δ, and superimposed on one another. The main optical axis Δ passes through the focal point located at the sample 4 to be analysed.

The first optical portion 10 is adapted to shape the primary light beam emitted by the optical emitter 2 in an annular manner around the main optical axis Δ, and to transmit it to the second optical portion 20. Hence, the first optical portion 10 is shaping portion.

Advantageously, the optical shaping portion 10 is herein catoptric (i.e. formed only by reflective optical elements), in particular when the primary light beam is polychromatic so as to limit the presence of chromatic aberrations, but also in the case where the primary light beam is monochromatic.

Thus, the compactness of the optical system is optimised. In addition, a possible emission of parasitic light beams, for example by fluorescence, by a dioptre material then excited by the monochromatic primary light beam is avoided. However, alternatively, it may be dioptric (formed only by refractive optical elements) or catadioptric (formed by refractive optical elements and by reflective optical elements), in particular when the primary light beam is monochromatic.

In this example, the optical shaping portion 10 includes a conical and central reflective surface 11, radially surrounded by a truncated conical and peripheral reflective surface 12. The reflective surface 11 is the input surface of the optical shaping portion 10, and the reflective surface 12 is its output surface. These different reflective surfaces are coaxial and centred on the main optical axis Δ.

The reflective surface 11 is conical and central, to the extent that the apex of the cone is located on the main optical axis Δ. In addition, it corresponds to an outer surface of the cone (turned towards the outside of the cone). It has herein a linear profile, but it could be convex or concave. The shape of the base of the cone is herein circular (an axisymmetric cone), but it could be oval, or polygonal.

The reflective surface 12 is truncated conical and peripheral. In other words, it corresponds to an inner surface of a truncated cone (turned towards the inside of the cone), so that the primary light beam could reach the reflective surface 11. It radially surrounds the reflective surface 11, and the reflective surfaces 11 and 12 are coaxial and centred on the main optical axis Δ. Preferably, the reflective surface 12 has a linear or concave profile, so as to limit the angular aperture of the reflected primary light beam. The shape of the base of the cone is herein identical to that of the reflective surface 11.

The reflective surface 11 is oriented towards the optical emitter 2 and towards the reflective surface 12. The latter is oriented towards the reflective surface 11 and towards a reflective surface 21 of the second optical portion 20.

Thus, the reflective surface 11 receives the primary light beam solid and collimated by that time, and reflects it towards the reflective surface 12. The primary light beam then becomes annular, and is therefore evenly distributed around the main optical axis Δ. It is reflected by the reflective surface 12 towards the reflective surface 21 of the second optical portion 20.

The second optical portion 20 is adapted to focus on the sample 4 the primary light beam annular by that time, and to collect a secondary light beam emitted by the sample 4 excited by that time and to transmit it to a photodetection system 3. Hence, the second optical portion 20 is focusing/collecting portion.

The optical focusing/collecting portion 20 is catoptric. Hence, it includes only reflective optical elements. The fact that it is combined with the first and third optical portions 10, 30 allows adapting the working distance and increasing the numerical aperture where necessary, depending on the intended applications, while segregating the optical paths of the primary light beam and of the measurement light beam.

It includes a conical and central upper reflective surface 21, superimposed and located thereabove along the main optical axis Δ of a conical and central lower reflective surface 24. These reflective surfaces 21, 24 are optically coupled to each other by at least the two truncated conical and peripheral reflective surfaces 22; 23. In this example, the optical focusing/collecting portion 20 includes two truncated conical and peripheral reflective surfaces, namely an upper reflective surface 22 and a lower reflective surface 23.

They are distinct from each other and arranged relative to each other so that each of the primary light beam and the secondary light beam is reflected at least once on the upper reflective surface 22 and at least once on the lower reflective surface 23. These different reflective surfaces are coaxial and centred on the main optical axis Δ.

The central reflective surface 21 is adapted to reflect towards the peripheral reflective surface 22 the primary light beam annular by that time originating from the reflective surface 12. It corresponds to an outer surface of the cone with a preferably convex profile. Preferably, the shape of the base of this non-truncated cone is identical to that of the reflective surface 12. It is superimposed and located below the reflective surface 11 and the reflective surface 12. The primary light beam is then reflected by a peripheral area 21.1 located proximate to the base of the cone. This peripheral area 21.1 is distinct from a central area 21.2 of the reflective surface 21 adapted to reflect the secondary light beam towards a reflective surface 31 of the third optical return portion 30. Hence, the central reflective surface 21 is also adapted to reflect towards the reflective surface 31 the secondary light beam originating from the peripheral reflective surface 22. The measurement light beam is then reflected by the central area 21.2 located proximate to the apex. The central area 21.2 has a surface area larger than or equal to 50%, and preferably 57%, of the total surface area of the central reflective surface 21. The surface area is herein defined as being a surface projected on a plane $(e_r, e_\theta)$.

The peripheral reflective surface 22 is adapted to reflect the primary light beam towards the peripheral reflective surface 23 and to reflect the secondary light beam towards the central reflective surface 21. It radially surrounds the central reflective surface 21. It has herein a profile that is preferably concave, a truncated cone shape and is an internal surface thereof (turned towards the inside of this truncated cone).

The peripheral reflective surface 23 is adapted to reflect the primary light beam towards the central reflective surface 24 and to reflect the secondary light beam towards the peripheral reflective surface 22. It radially surrounds the central reflective surface 24, and is superimposed and located below the peripheral reflective surface 22. Preferably, it has a truncated cone shape, with a linear profile. It consists of an internal surface (turned towards the inside of this truncated cone).

Figure 4:
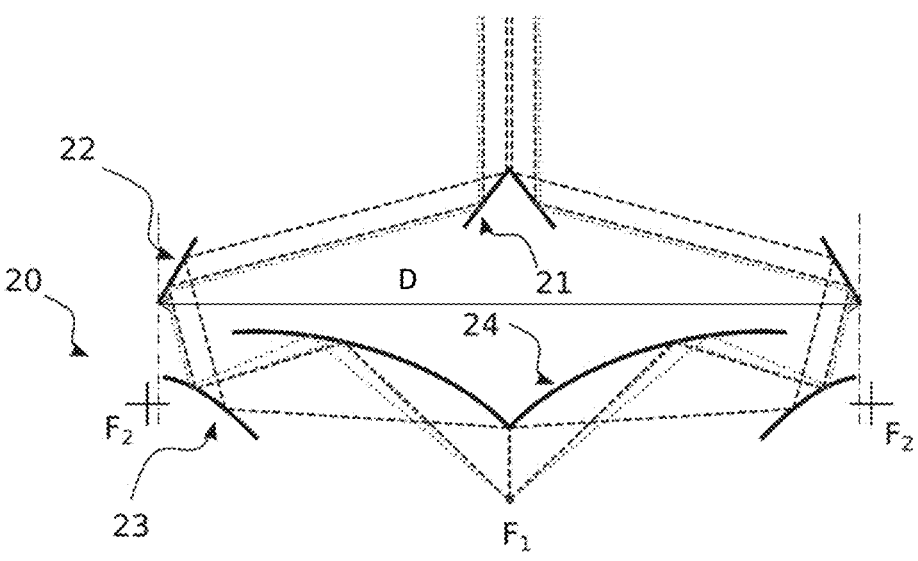
FIG. 4 is a schematic and partial view, in section, of an optical focusing/collecting portion of an optical system according to one variant.

FIG. 4 schematically illustrates an optical focusing/collecting portion 20 according to a variant of the optical portion 20 illustrated in FIG. 1 (herein in the context of a metallic-type reflection), wherein the surface 21 and the surface 22 have a linear profile, the surface 23 has a convex parabolic shape (with a focus F2), and the surface 24 has a concave elliptical profile (with focuses F1 and F2). Note that this example is compatible with a metallic-type reflection as well as with a vitreous-type reflection (detailed later on). Anyway, each of the reflective surfaces 22 and 23 has a profile adapted to ensure the optical coupling between the reflective surfaces 21 and 24. The profiles of these different reflective surfaces 21 to 24 can be concave, convex, linear, parabolic, elliptical, etc.

The central reflective surface 24 is adapted to reflect and focus on the sample 4 the annular primary light beam originating from the peripheral reflective surface 23. Hence, the surface has a concave profile. This non-truncated cone has an apex oriented towards the sample 4, and the reflective surface 24 is the outer surface thereof (turned towards the outside of the cone). The primary light beam is reflected by a peripheral area 24.1 located proximate to its base. Hence, the central reflective surface 24 is also adapted to reflect towards the peripheral reflective surface 23 the secondary light beam emitted by the sample 4 excited by that time. The portion of the secondary light beam collected by that time which will be received by the photodetection system 3 (measurement light beam) is reflected by the central area 24.2 located proximate to the apex.

The third optical portion 30 is adapted to transmit the measurement light beam to the photodetection system 3. It is then called the optical return portion.

It includes a reflective surface 31 centred on the main optical axis Δ, and located between the reflective surface 12 and the central reflective surface 21 along the main optical axis Δ. In addition, the reflective surface 31 is located in the space delimited radially by the annular primary light beam supplied by the reflective surface 12. The reflective surface 31 herein reflects the measurement light beam along a radial direction $e_r$ herein in the direction of a second return surface 32, herein reflective, which focuses the measurement light beam on the photodetection system 3. Alternatively, this reflective surface 32 may be absent, or several reflective surfaces 32 may be provided on the optical path of the measurement light beam. In addition, where necessary, optical filters and other optical elements may be disposed between the surfaces 31 and 32.

In operation, the optical emitter 2 emits a primary light beam, which is herein monochromatic, solid and collimated, in the direction of the optical system 1, along the main optical axis Δ. The optical system 1 will shape it and focus it on sample 4 to be analysed.

First of all, the primary light beam is received by the optical shaping portion 10, which will make it annular. For this purpose, it is reflected by the conical reflective surface 11 radially in the direction of the truncated conical reflective surface 12, then is reflected by this reflective surface 12 in the direction of the optical focusing/collecting portion 20. The primary light beam is then made annular.

The primary light beam annular by that time propagates along the main optical axis Δ without being disturbed by the presence of the reflective surface 31 of the optical return portion 30. Indeed, the latter has dimensions in the plane $(e_r, e_\theta)$ smaller than the internal dimensions of the primary light beam.

Afterwards, the primary light beam is received by the optical focusing/collecting portion 20, which will focus it at a focal point located at the sample 4. For this purpose, it is reflected by the conical reflective surface 21 at its peripheral area 21.1 radially in the direction of the truncated conical reflective surface 22, is reflected by this reflective surface 22 in the direction of the truncated conical reflective surface 23, then is reflected by this reflective surface 23 in the direction of the conical reflective surface 24 which focuses it on the sample 4 to be analysed.

Figure 2A:
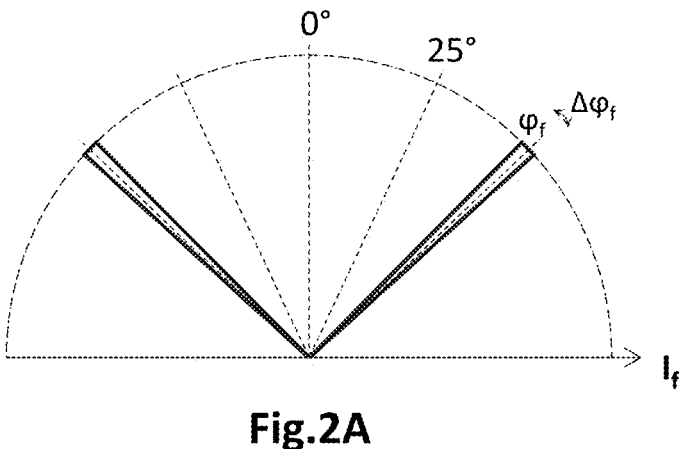
FIG. 2A illustrates an example of a focusing cone of the primary light beam emitted by the optical emitter and transmitted by the optical system illustrated in FIG. 1.

FIG. 2A illustrates an example of a focusing cone of the primary light beam on the sample 4 to be analysed. This consists herein of the angular distribution of the intensity If of the primary light beam around the main optical axis Δ.

The primary light beam is inclined with respect to the main optical axis Δ by an angle of inclination $\phi_f$ and has an angular aperture $\Delta\phi_f$, so that the primary light beam is contained in a cone, delimited herein between a minimum angle $\phi_f - \Delta\phi_f/2$ and a maximum angle $\phi_f + \Delta\phi_f/2$ and centred on the angle $\phi_f$, and annular around the main optical axis Δ. In this example, the primary light beam is annular on a circular base, but the same reasoning applies for a ring with a polygonal base.

It arises that the combination of the optical shaping portion 10 and the optical focusing/collecting portion 20 allows obtaining a significant minimum angle of inclination $\phi_f - \Delta\phi_f/2$, for example at least equal to 250, or at least equal to 40°. In this example, the minimum angle of inclination $\phi_f - \Delta\phi_f/2$ is equal to about 450, and the angular aperture $\Delta\phi_f$ is equal to about 5°.

This particularly inclined focusing allows focusing the working distance according to the intended applications, this working distance being herein defined as the distance between the apex of the reflective surface 24 and the sample 4 to be analysed along the main optical axis $\Delta$. For example, it can thus be comprised between about 0.5 mm and about 5 mm for a maximum inner diameter of about 4 cm of the optical portion 20. As mentioned before, this maximum inner diameter D is herein defined as the maximum distance, along an axis orthogonal to the main optical axis $\Delta$, connecting two opposite points of a radial end of the reflective surfaces 22 and 23 (cf. FIG. 3A). Thus, for a given value of the maximum inner diameter D of the optical portion 20, it is possible to have a small working distance (and therefore a very large numerical aperture) for a use requiring great compactness, or a larger working distance (and therefore a numerical aperture that could remain large) for a use requiring for example the insertion of a working material between the optical system 1 and the sample 4. The value of the working distance depends on the value of the maximum inner diameter D as well as the profile of the reflective surfaces 21, 22, 23 and 24.

Thus, the performances of the optical system and the homogeneity of the illumination of the sample are improved by averaging the illumination according to the large aperture angle of the optical system 1, for example in the range of 0.7. In addition, the size of the optical system 1 is particularly reduced. And the use of a dichroic filter is not necessary.

Return back to FIG. 1. The sample 4 to be analysed, excited by that time by the primary light beam, in return emits a secondary light beam in the direction of the optical system 1. For illustration, it may consist of a fluorescence-type emission in which case the central wavelength of the secondary light beam may be larger than that of the primary light beam, or a Raman-type emission in which case the central wavelength of the secondary light beam is close to that of the primary light beam.

First of all, the secondary light beam is collected by the optical focusing/collecting portion 20, which reflects it towards the optical return portion 30. Thus, it is reflected by the conical reflective surface 24 radially towards the truncated conical reflective surface 23 (it is then made annular), then is reflected by the reflective surface 23 towards the truncated conical reflective surface 22, then is reflected by the reflective surface 22 towards the conical reflective surface 21, which finally reflects it towards the optical return portion 30.

Thus, the secondary light beam can be collected by the entire surface area of the reflective surface 24. Hence, the optical system does not have an intrinsic dark area in the collecting cone, i.e. a zero intensity area (hollow collecting cone) at the main optical axis due to the operating principle of the optical system, which improves the performances of the optical system 1.

Figure 2B:
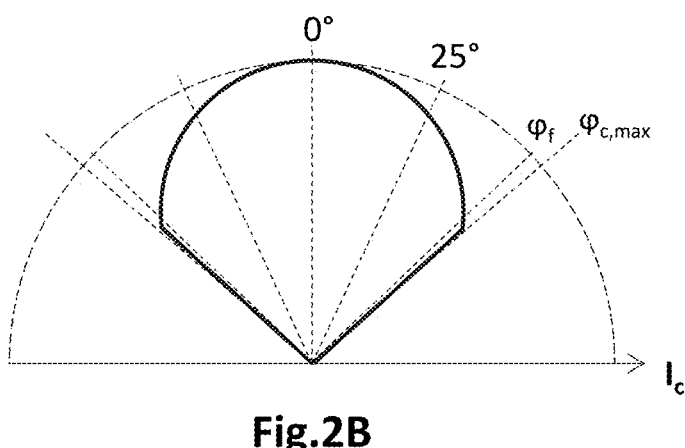
FIG. 2B illustrates an example of a collecting cone of the secondary light beam emitted by a sample to be analysed in response to the primary light beam, and collected by the optical system illustrated in FIG. 1.

In this respect, FIG. 2B illustrates an example of a cone for collecting the secondary light beam by the reflective surface 24. This consists herein of the angular distribution of the intensity Ic of the secondary light beam around the main optical axis $\Delta$.

Thus, it arises that the collecting cone is solid, i.e. it has a non-zero intensity between 0° and $\phi_{c,max}$. Hence, the optical system has no dark area in the collecting cone. In this example, the angle $\phi_{c,max}$ is substantially equal to the values $\phi_f - \Delta\phi_f/2$ and $\phi_f + \Delta\phi_f/2$, but it could be larger than these values. Thus, the collection rate is particularly significant. The collection rate may be defined as the ratio of the number of photons emitted by the sample 4 and collected to the number of secondary photons emitted by the sample 4. It may also be the ratio of the cumulative intensity of the secondary light beam integrated in the collecting cone to the cumulative intensity of the secondary light beam integrated in the half-space $(e_r, e_\theta, +e_z)$.

Return back to FIG. 1. The secondary light beam annular by that time is reflected by the reflective surface 21 in the direction of the reflective surface 31 of the optical return portion 30. Preferably, it has become solid again by that time.

The secondary light beam received by the reflective surface 31 is the measurement light beam, i.e. the portion of the secondary light beam received by the photodetection system 3. It has been reflected by the central area 21.2 of the reflective surface 21, and propagates in the space radially delimited by the annular primary light beam propagating between the reflective surfaces 12 and 21.

Thus, a small portion of the collected secondary light beam is reflected in the direction of the optical shaping portion 10 (that reflected by the peripheral area 21.1). However, this peripheral area 21.1 has a smaller surface area than that of the central area 21.2, so that the detection rate could be particularly high, thereby improving the performances of the optical system.

Afterwards, the measurement light beam is reflected by a reflective surface 32 and focused on the focal plane of the photodetection system 3.

Figure 2C:
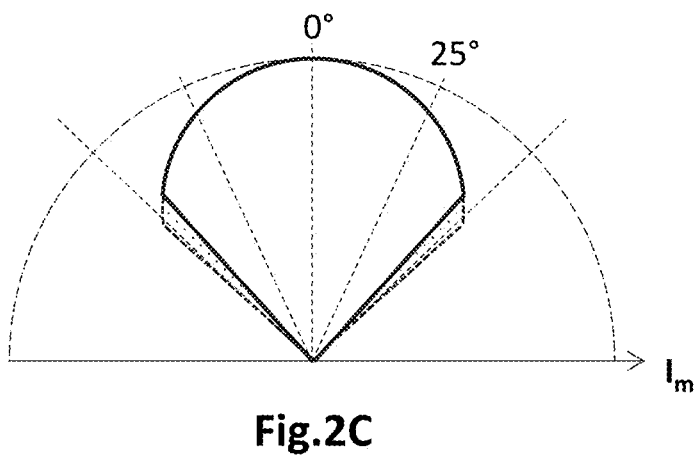
FIG. 2C illustrates an example of a collecting cone of the measurement light beam, i.e. of the portion of the secondary light beam collected by the optical system illustrated in FIG. 1, and detected by the photodetection system.

FIG. 2C illustrates an example of a cone for collection by the reflective surface 24 associated with the measurement light beam. This consists herein of the angular distribution of the intensity Im of the measurement light beam around the main optical axis $\Delta$. In particular, this consists of the portion of the secondary light beam collected by the central area 24.2. The collecting cone of the secondary light beam corresponds, at the first order, to the sum of the focusing cone illustrated in FIG. 2A and the collecting cone of the measurement light beam illustrated in FIG. 2C. To the extent that the angular aperture $\Delta\phi_f$ is small, the collecting cone of the measurement light beam, and therefore the detection rate, is particularly large.

Thus, the optical system 1 allows focusing on a sample to be analysed a primary light beam emitted by an optical emitter 2, then collecting a secondary light beam emitted by the sample 4 excited by that time and finally transmitting the secondary light beam up to a photodetection system 3. In this example, the optical system 1 is entirely catoptric, which allows, in particular, getting rid of chromatic aberrations, spherical aberrations and making a particularly compact optical system.

Moreover, by the superposition of the three optical portions 10, 20, 30, which are centred on the main optical axis $\Delta$, and in particular by the fact that the optical portion 10 makes the primary light beam annular in order to transmit it afterwards to the optical focusing/collecting portion 20, the optical system 1 has a working distance which can be adapted for a given value of the maximum inner diameter D of the optical portion 20, and a large numerical aperture, preferably larger than or equal to 0.5, for example in the range of 0.7. In addition, by the fact that the reflective surface 31 of the optical portion 30 is located between the optical portions 10 and 30 and disposed inside the space delimited radially by the primary light beam annular by that time, the optical system allows segregating the optical paths associated with the primary light beam and with the measurement light beam. The optical system then allows avoiding the use of a dichroic mirror or filter, thereby improving the performances of the optical system 1. The collection rate as well as the detection rate are optimised. Besides, resorting to such spatial segregation methods allows limiting the phenomenon of parasitic fluorescence of the reflective surfaces caused by the primary light beam which could be captured by the photodetection system. Therefore, the signal-to-noise ratio is particularly increased.

Figure 3A:
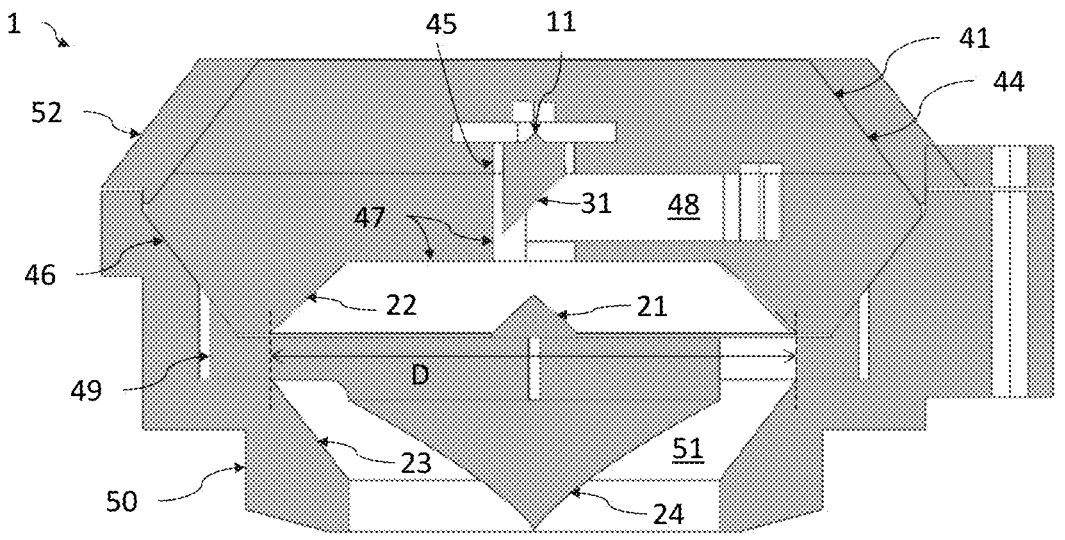
FIGS. 3A and 3B are schematic and partial views, in section (FIG. 3A) and in perspective (FIG. 3B), of an optical system according to an embodiment similar to that illustrated in FIG. 1.
Figure 3B:
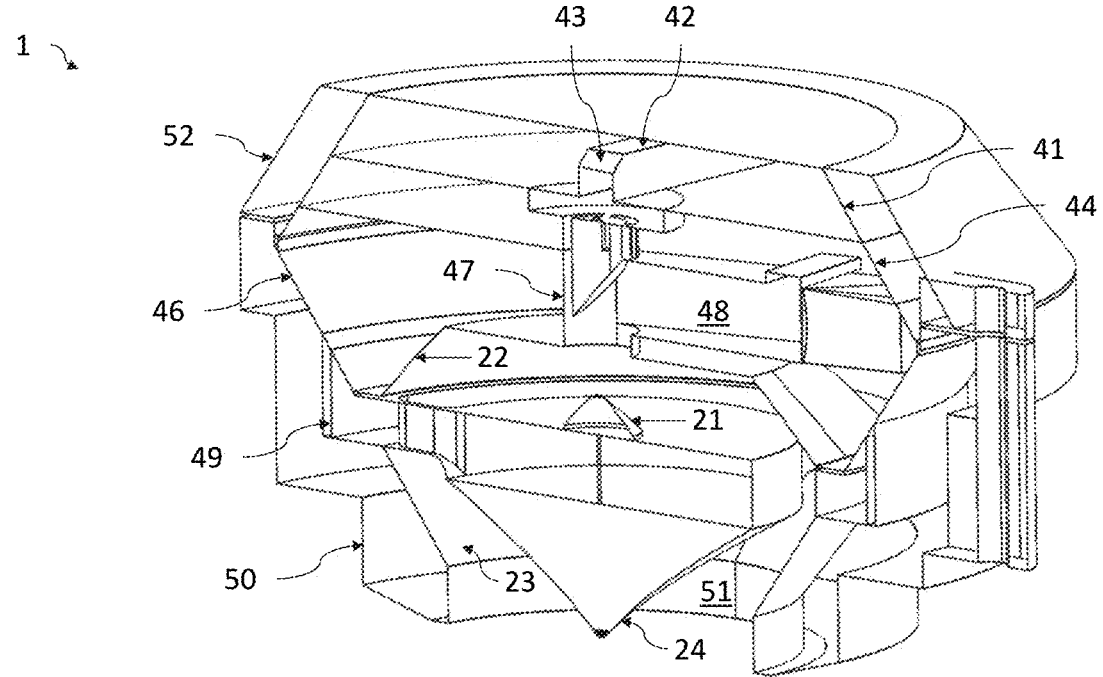

FIGS. 3A and 3B are schematic and partial views, in cross-section (FIG. 3A) and in perspective (FIG. 3B), of an optical system 1 similar to that schematically illustrated in FIG. 1. In this embodiment, the reflection of the emitted and collected light beams is a metallic-type reflection. More specifically, these beams herein propagate within the optical focusing/collecting portion 20 in a fluid medium or in vacuum, and are reflected by the reflective surfaces 21 to 24 made based on a metal (Ag, Al, Au, etc.).

The optical system 1 includes several rigid blocks assembled together, around a mechanical axis which corresponds to the main optical axis $\Delta$.

The optical system 1 herein includes a cover 41 including a radial conduit 42 intended to enable the propagation of the primary light beam along a direction $-e_r$, the radial conduit 42 having a reflective surface 43, centred on the main optical axis $\Delta$, adapted to reflect the incident primary light beam in the direction of the reflective surface 11.

The optical system 1 includes a first inner structure 44, located in contact with and below the cover 41, including a through orifice 45 in which a solid axisymmetric cone is located. This axisymmetric cone has an upper face at which the reflective surface 11 is defined, and a lower face at which the reflective surface 31 is defined. The boundary of the through hole is structured so as to define the truncated conical reflective surface 12 (not represented herein). The free space between the full axisymmetric cone and the boundary of the through orifice 45 enables the propagation of the primary light beam made annular by that time.

The optical system 1 includes a second inner structure 46, located in contact with and below the first inner structure 44, including a through orifice 47 enabling the propagation of the annular primary light beam up to the reflective surface 21. It includes a radial duct 48 enabling the propagation of the measurement light beam, then reflected by the reflective surface 31, in the direction of the photodetection system (via a reflective surface 32). The through hole 47 has a larger lateral dimension at the lower portion of the second inner structure 46. An inner surface of the through hole 47 then defines the reflective surface 22.

The optical system 1 includes a third inner structure 49, located in contact with and below the second inner structure 46. It includes a central block an upper face of which defines the conical reflective surface 21, and a lower face defines the conical reflective surface 24.

The optical system 1 includes a fourth structure 50, located in contact with and below the third inner structure 49. It includes a through hole 51 in which the central block partially extends, including the conical reflective surface 24. An inner boundary defines the reflective surface 23.

Finally, a holding structure 52 is assembled to the fourth structure 50, and comes into contact with the first, second and third structures 44, 46, 49 to ensure holding thereof.

Thus, the optical system 1 has a particularly high compactness, and may have dimensions smaller than or equal to 5×5×5 cm. This optimised optical system according to the invention may have low optical losses, in particular due to the mechanical construction, for example less than 7%.

Particular embodiments have just been described. Various variations and modifications will appear to a person skilled in the art.

Thus, optical fibres can ensure the optical coupling between the optical emitter 2 and the reflective surface 11, and between the reflective surface 31 or 32 and the photodetection system 3.

Moreover, a spectral filter may be disposed between the reflective surface 31 or 32 and the photodetection system 3, so as to transmit only the spectral band intended to be detected.

Finally, in general, the reflection of the light beams emitted and/or collected by the reflective surfaces of the optical system 1 may be a metallic-type reflection (as in the example of FIGS. 3A and 3B) and/or a vitreous-type reflection (i.e. by total internal reflection).

Figure 5:
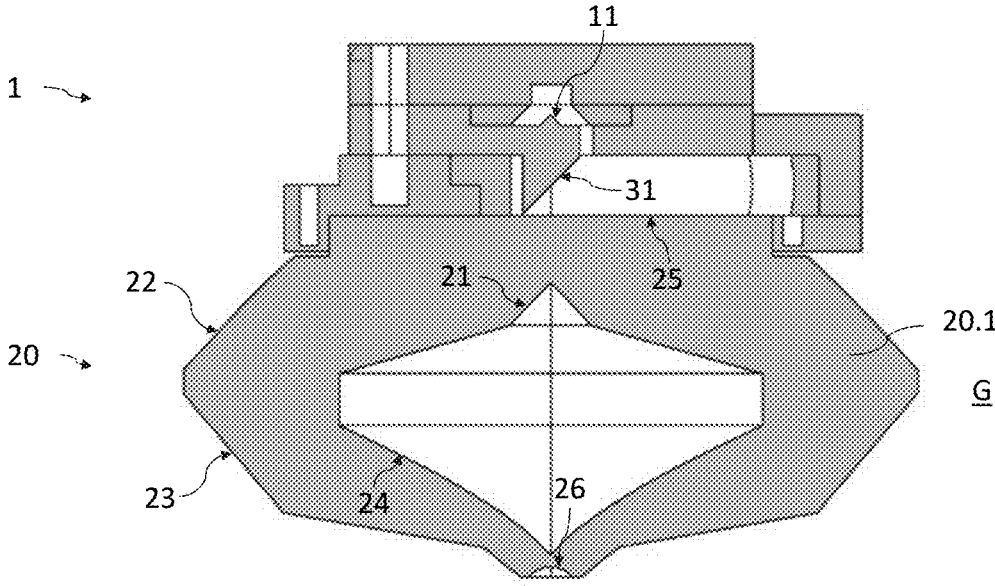
FIG. 5 is a schematic and partial view, in section, of an optical system according to a variant in which the reflection by the reflective surfaces of the optical focusing/collecting portion is a vitreous-type reflection (by total internal reflection).

In this respect, FIG. 5 illustrates an optical system 1 according to another embodiment wherein the reflection of the light beams emitted and collected by the reflective surfaces 21 to 24 of the optical focusing/collecting portion 20 is a vitreous-type reflection, i.e. by total internal reflection. Also, they propagate in the optical portion 20 within a solid material 20.1 transparent to the wavelength of the light beams (for example an optical polymer, diamond, etc.). The curvatures of the mirrors are such that the angles of reflection always meet the well-known condition of total internal reflection which herein involves the refractive indexes of the transparent material 20.1 and of the environment G. In this respect, in this example, the transparent material 20.1 may herein consist of an optical polymer with a refractive index equal to 1.5 (for example of the Zeonex® type), which is surrounded by air G with a refractive index equal to 1.

In this example, the emitted light beams propagate in the optical shaping portion 10 in a fluid medium or in vacuum and are reflected by the metallic reflective surfaces 11 and 12. Afterwards, they enter the optical portion 20 by crossing an upstream surface 25 (herein planar) in an orthogonal manner, and propagate in the transparent material. They are reflected by the reflective surfaces 21 to 24 by total internal reflection. They come out of the optical portion 20 by crossing a downstream surface 26 (herein curved) in an orthogonal manner. This downstream surface herein has a spherical shape whose centre is coincident with the focal point of the optical system 1. The collected light beams follow a similar reverse path up to the reflective surface 31.

In particular, the optical system 1 according to this variant has the advantage that the reflective surfaces 21 to 24 have a very high reflectivity, higher than that of metal surfaces, which improves the performances of the optical system 1. In addition, the optical portion 20 is made in one piece and of the same material, which simplifies the manufacture and the relative arrangement of the different elements, in particular compared to the case where the optical portion 20 would be formed of several distinct elements. In addition, the surfaces 21 and 24 no longer need a mechanical holding system that would be located in the passage of the optical beams.

What is claimed is:

1. An optical focusing and collecting system, intended to focus on a sample to be analysed, a primary light beam emitted by an optical emitter, and to collect a secondary light beam emitted by the sample in response to the primary light beam and to transmit the secondary light beam to a photodetection system, wherein the optical focusing and collecting system includes several optical portions each centred along a main optical axis:

a first optical portion having an input surface and an output surface, wherein the input surface is configured to receive the primary light beam and supply the primary light beam to the output surface to form an annular primary light beam around the main optical axis;

a second optical portion, including:

an upper central conical reflective surface formed by a central area surrounded by a peripheral area, and configured to reflect by the peripheral area the annular primary light beam originating from the output surface of the first optical portion, and to reflect by the central area the secondary light beam originating from a lower central conical reflective surface;

the lower central conical reflective surface configured to reflect and focus on the sample the primary light beam originating from the upper central conical reflective surface; and to collect and reflect the secondary light beam emitted by the sample;

at least two truncated conical and peripheral reflective surfaces, the truncated conical and peripheral reflective surfaces being configured to optically couple the upper central conical reflective surface and the lower central conical reflective surface; and a third optical return portion, including a reflective surface:

located between the output surface of the first optical portion and the upper central conical reflective surface of the second optical portion, along the main optical axis and having transverse dimensions smaller than those of the annular primary light beam supplied by the output surface, and configured to reflect in the direction of the photodetection system, the secondary light beam originating from the central area of the upper central conical reflective surface.

2. The optical focusing and collecting system according to claim 1, wherein the first, second and third optical portions are superimposed axially on one another along the main optical axis.

3. The optical focusing and collecting system according to claim 1, wherein the first optical portion is catoptric, the input and output surfaces being reflective.

4. The optical focusing and collecting system according to claim 1, wherein the second optical portion is conical and catoptric, the upper and lower central conical reflective surfaces being superimposed on one another and coaxial along the main optical axis.

5. The optical focusing and collecting system according to claim 1, wherein said at least two truncated conical and peripheral reflective surfaces of the second optical portion include:

an upper peripheral reflective surface of the at least two truncated conical and peripheral reflective surfaces, in the form of a hollow truncated cone radially surrounding the upper central conical reflective surface, configured to reflect the primary light beam originating from the upper central conical reflective surface, and to reflect the secondary light beam originating from a lower peripheral reflective surface of the at least two truncated conical and peripheral reflective surfaces; and the lower peripheral reflective surface, in the form of a hollow truncated cone radially surrounding the lower central conical reflective surface, configured to reflect the primary light beam originating from the upper peripheral reflective surface, and to reflect the secondary light beam originating from the lower central conical reflective surface.

6. The optical focusing and collecting system according to claim 1, wherein the primary light beam is focused by the lower central conical reflective surface according to a central angle of inclination with respect to the main optical axis at least equal to 25°.

7. The optical focusing and collecting system according to claim 1, wherein the second optical portion has a numerical aperture greater than or equal to 0.5.

8. The optical focusing and collecting system according to claim 1, wherein the second optical portion has a working distance along the main optical axis between an apex of a cone formed by the lower central conical reflective surface and a focal point, depending on a maximum inner diameter of the second optical portion and a profile of the truncated conical and peripheral reflective surfaces and of the upper and lower central conical reflective surfaces, the maximum inner diameter being defined as a maximum distance along an axis orthogonal to the main optical axis, between two opposite points of a radial end of the truncated conical and peripheral reflective surfaces.

9. An analysis system including an optical focusing and collecting system according to claim 1, further including the optical emitter configured to emit the primary light beam, and the photodetection system configured to detect the secondary light beam.

10. The analysis system according to claim 9, wherein the optical emitter emits a collimated primary light beam and is incident on the input surface.

*    *    *    *    *